United States Patent [19]

Boyer et al.

[11] Patent Number: 5,443,290
[45] Date of Patent: Aug. 22, 1995

[54] FLOATING RING EXPANSION JOINT LINER SEAL

[75] Inventors: Robert C. Boyer, Annapolis, Md.; Vincent J. DiSciullo, Wilmington, Del.

[73] Assignee: Mid-Atlantic Technical Services Incorporated, Annapolis, Md.

[21] Appl. No.: 160,880

[22] Filed: Dec. 3, 1993

[51] Int. Cl.⁶ .............................................. F16L 17/02
[52] U.S. Cl. ...................................... 285/95; 285/187; 285/226; 285/231; 285/300; 285/379; 277/174; 277/47; 277/50
[58] Field of Search .................. 285/300, 95, 96, 187, 285/224, 225, 226, 229, 231, 379, 41, 108; 277/35, 47, 50, 174

[56] References Cited

U.S. PATENT DOCUMENTS

| | | | |
|---|---|---|---|
| 1,076,738 | 10/1913 | Berry | 285/224 X |
| 2,055,917 | 9/1936 | Victor et al. | 277/50 |
| 2,183,596 | 12/1939 | Trinks | 158/99 |
| 2,308,757 | 1/1943 | Hulsberg | 285/96 |
| 2,337,038 | 12/1943 | Fentress | 285/90 |
| 2,742,306 | 4/1956 | Kelso et al. | 277/174 |
| 2,793,883 | 5/1957 | Main, Sr. | 285/229 |
| 3,194,589 | 7/1965 | Kahlbay et al. | 285/228 X |
| 3,275,331 | 9/1966 | Mastrobattista et al. | 277/35 X |
| 3,339,932 | 9/1967 | Maha | 277/37 |
| 3,372,076 | 3/1968 | Wilkinson | 285/229 X |
| 3,427,051 | 2/1969 | White et al. | 285/95 X |
| 3,469,862 | 9/1969 | Conibeer | 285/41 |
| 3,695,639 | 10/1972 | Shire et al. | 285/231 X |
| 3,704,034 | 11/1972 | Shire et al. | 285/187 X |
| 4,299,414 | 11/1981 | Bachmann | 285/187 |
| 4,576,404 | 3/1986 | Weber | 285/41 |
| 4,693,499 | 9/1987 | Servé | 285/96 |
| 4,702,671 | 10/1987 | Brinkman et al. | 277/174 X |
| 4,732,396 | 3/1988 | Brigham et al. | 277/3 |
| 5,159,811 | 11/1992 | Hefler et al. | 285/187 X |
| 5,340,165 | 8/1994 | Sheppard | 285/226 |

FOREIGN PATENT DOCUMENTS

| | | | |
|---|---|---|---|
| 721633 | 12/1931 | France | 277/174 |
| 1388056 | 3/1975 | United Kingdom | 277/174 |

Primary Examiner—Randolph A. Reese
Assistant Examiner—Heather Chun Shackelford
Attorney, Agent, or Firm—Foley & Lardner

[57] ABSTRACT

An expansion joint includes first and second conduits connected by an expansion joint element. The second conduit has a liner portion which protrudes into the first conduit, so that the expansion joint element, first conduit, second conduit and liner portion together define an expansion joint cavity. A cartridge is located within the expansion joint cavity and is affixed to an end portion of the first conduit. The cartridge has a groove which faces the liner portion and houses a ring which slides within the groove while maintaining sliding contact with the liner portion of the second conduit. The outer diameter of the groove is preferably larger than an outer diameter of the ring to allow lateral movement of the first and second conduits relative to one another. Either the expansion joint cavity or the cartridge groove may be provided with a purge fluid inlet to prevent the intrusion of the service fluid and its associated contaminants into the expansion joint cavity.

7 Claims, 3 Drawing Sheets

5,443,290

FLOATING RING EXPANSION JOINT LINER SEAL

BACKGROUND OF THE INVENTION

The present invention relates generally to expansion joints, and more particularly, to a purged expansion joint with a floating liner seal.

In general, piping systems must be designed so that they will not fail because of excessive stresses, or leak at joints because of expansion or deflection of the pipe elements. In many instances these requirements can be attended to by use of a so-called expansion joint. In such a joint, a length of tubing or pipe to be joined typically has a reduced diameter end portion which is received by another tube or pipe. The reduced diameter end portion is sometimes referred to as a liner and is dimensioned relative to the receiving pipe so as to allow axial and lateral movement of the pipe elements relative to one another. A coaxial bellows unit is then used to connect and seal the two pipe elements by forming a flexible external shroud over the junction of the pipes. The bellows, liner and pipe elements together define an expansion joint cavity or annular region around the junction of the pipes. The liner guides movement of the joint and also protects the flexible bellows from direct contact with the fluid being handled.

Since expansion joints must absorb a variety of movements simultaneously, including axial deflection (i.e. parallel to the axis of the pipe or duct), lateral deflection (i.e. perpendicular to the axis of the pipe or duct), and angular deflection (i.e. rotation about an axis perpendicular to the axis of the pipe or duct), it is not feasible for the liner to fit tightly within the receiving pipe. Therefore, a certain amount of service fluid or particulates from the flowstream will generally reach the bellows unit by traveling through the gap between the liner and the inner surface of the receiving pipe. Depending on the nature of the fluid materials being transported and the particular bellows material employed, such influx may result in damage to the bellows or impairment of the elasticity of the joint. In applications where a stagnancy in the flowstream can cause an unwanted chemical reaction, for example in methylacrylate plants, the introduction of particulate from the flowstream into the expansion joint is particularly unacceptable.

In order to avoid the problems associated with communication of particulates or service fluid into an expansion joint, there have been developed purged systems which circulate a purge fluid into the expansion joint cavity. For example, U.S. Pat. No. 4,576,404 to Weber describes a vertically-oriented bellows expansion joint which incorporates an internal flange and cylindrical weir to define an inner flushing reservoir adjacent to the expansion bellows.

Purged expansion joints have heretofore been limited to use under certain conditions and have required large flow rates to prevent the intrusion of particulates or service fluid from the flowstream into the expansion joint cavity. However, the maintenance of large flow rates in a purged expansion joint decreases operating efficiency and is likely to introduce impurities into the flowstream. Moreover, since suitable purge fluids are usually costly to produce and to transport in a system, purged expansion joints have been costly to operate. In fact, the purge fluid is often considered more valuable than the typical flowstream.

SUMMARY OF THE INVENTION

Accordingly, it is an object of the present invention to provide an expansion joint which prevents particulates or fluids associated with the flowstream from entering the expansion joint cavity.

It is another object of the present invention to provide an expansion joint which minimizes the purge fluid flow rate necessary to prevent particulates or fluids from entering the expansion joint cavity.

It is a further object of the present invention to provide a purged expansion joint which prevents contamination of the flowstream by the purge fluid.

Yet another object of the present invention is to provide a purged expansion joint which minimizes the amount of purge fluid necessary to prevent particulates or fluids from entering the expansion joint cavity.

These objects and others are accomplished according to one aspect of the present invention by providing an expansion joint which includes first and second conduits connected by an expansion joint element, such as a bellows or an elastic tube. The second conduit has a liner portion which protrudes into the first conduit, so that the expansion joint element, first conduit, second conduit and liner portion together define an expansion joint cavity. A cartridge is located within the expansion joint cavity and is affixed to the first conduit around the liner portion. The cartridge has a groove which faces the liner portion and houses a ring which slides within the groove while collaring the liner portion of the second conduit. The outer diameter or peripheral dimension of the groove is preferably larger than an outer diameter or peripheral dimension of the ring to allow lateral movement of the liner and, thus, movement of the first and second conduits relative to one another. Either the expansion joint cavity or the cartridge groove may be provided with a purge fluid inlet to allow introduction of a purge fluid into the expansion joint cavity, thereby preventing intrusion of the service fluid or its associated contaminants into the cavity.

Furthermore, the first and second conduits may each include a flange portion, in which case the expansion joint element is connected between the flange portions of the first and second conduits. If flanges are provided, the cartridge is disposed within the expansion joint cavity and is preferably affixed to the flange portion of the first conduit around the liner portion of the second conduit. Once again, either the expansion joint cavity or the cartridge groove may be provided with a purge fluid inlet to prevent intrusion of the service fluid or its associated contaminants. Furthermore, an inner surface of the ring may be rounded such that it offers no restriction to angular movement of the liner.

There has also been provided, according to another aspect of the invention, an expansion joint liner seal comprising a frame-like cartridge with an inwardly facing groove for attachment to a flange portion of a first conduit, and a ring disposed partially within the groove for collaring a liner portion of a second conduit.

According to yet another aspect of the invention, there has been provided a method for transporting service fluid through an expansion joint comprising the steps of (a) providing an expansion joint which includes first and second conduits connected by an expansion joint element, the second conduit having a liner portion which protrudes from one end thereof into the first conduit such that the expansion joint element, first conduit, second conduit and liner portion define an expansion joint cavity therebetween; a purge fluid inlet which leads into the expansion joint cavity; a cartridge which is disposed within the expansion joint cavity and affixed to the first conduit, the cartridge including a groove which faces the liner portion; and a ring which is disposed within the groove and which has an inner portion forming a collar around the liner portion; (b) introducing purge fluid into the expansion joint cavity through the purge fluid inlet; and (c) transporting a service fluid through the first and second conduits.

Other objects, features and advantages of the present invention will become apparent to those skilled in the art when the preferred embodiments of the invention are more fully described below with reference to the drawings.

BRIEF DESCRIPTION OF THE DRAWINGS

The present invention is explained more fully with reference to the accompanying Figures in which.

DETAILED DESCRIPTION OF THE PREFERRED EMBODIMENTS

Figure 1:
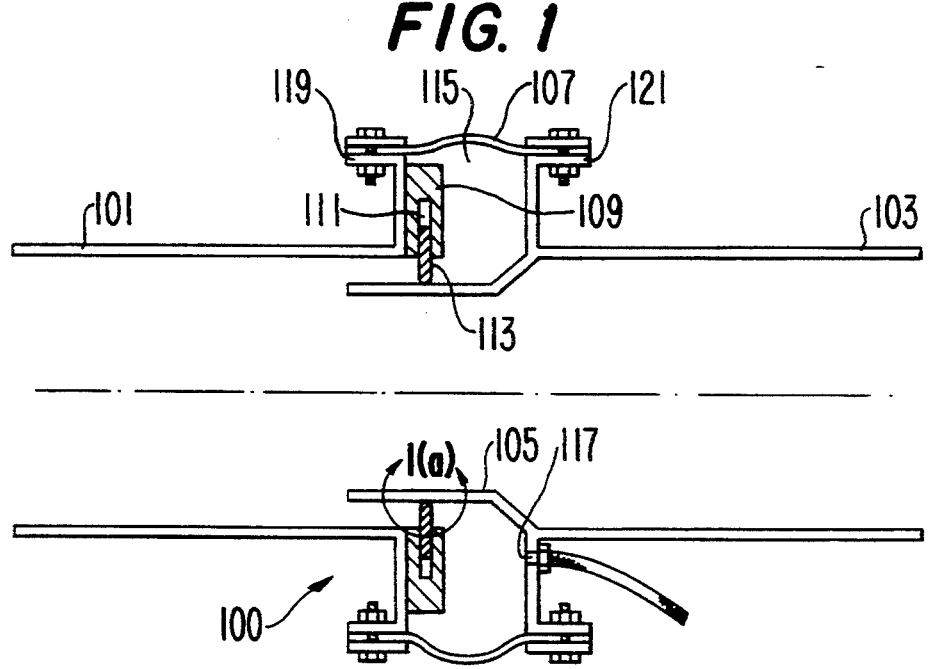
FIG. 1 is a cross-sectional view of the expansion joint of the present invention in a neutral position.
Figure 3:
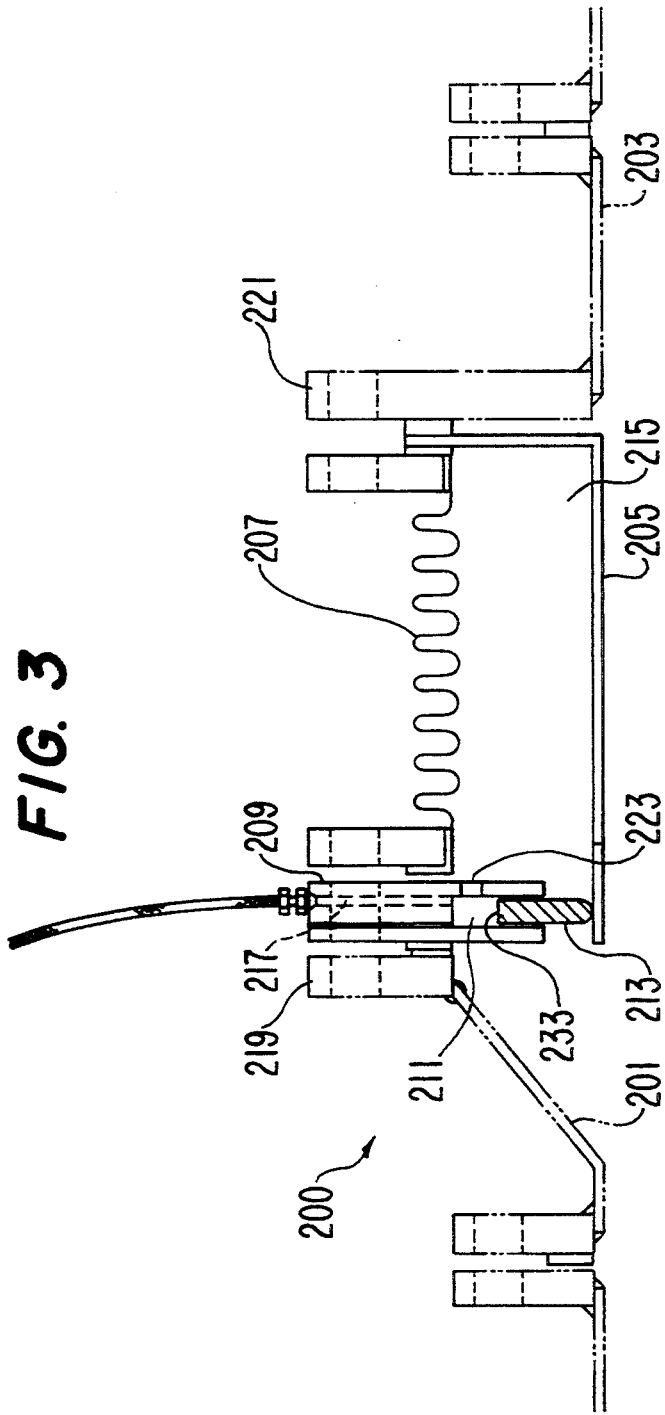
FIG. 3 is an illustration of a purge gas inlet which leads into the cartridge of the present invention.

Referring now to FIG. 1, an expansion joint 100 is shown in a neutral position. The expansion joint 100 includes a first conduit or pipe 101 and a second conduit or pipe 103. First and second conduits 101, 103 may be of any cross-sectional shape, and may, for example, comprise metal ductwork or plastic tubing depending on the temperature, pressure and chemical characteristics of the fluid or material to be transported. The second conduit 103 further includes a liner 105 which protrudes into and is received by the first conduit 101. The liner 105 may be formed as an integral part of the second conduit 103, as shown in FIG. 1, or may comprise a separate tubular element 205 as shown in FIG. 3. In either case, the liner 105 or 205 should be dimensioned so as to fit within at least an end portion of the first conduit 101 or 201, with sufficient clearance to allow axial, lateral and rotational movement of the conduits 101 and 103 (or 201 and 203) relative to one another. The amount of clearance necessary will depend on the particular application for which the expansion joint is to be employed.

An expansion joint element 107, which can for example be an elastic tube (FIGS. 1 and 2) or a bellows 207 (FIG. 3), is connected between the first and second conduits 101 and 103. The expansion joint element 107 (or 207) can be made of a metal, fabric, rubber, plastic (e.g. Teflon or clear PFA film), or some combination of these materials, depending on the design temperature and pressure of the system and the amount and direction of movements to be absorbed. Although the expansion joint element 107 can have any cross-sectional shape which is suitable for attachment to the first and second conduits 101 and 103, it is typically round or rectangular in cross-section since these are standard pipe or conduit cross-sections. In one embodiment, the expansion joint element 107 is attached to flanges 119 and 112 located at or near the ends of conduits 101 and 103.

Although ring retainers and bolts are shown for attaching the expansion joint element 107 to flanges 119 and 121, it will be appreciated that other methods can be used to secure and seal the ends of the expansion joint element 107 including bonding with adhesives.

Figure 2:
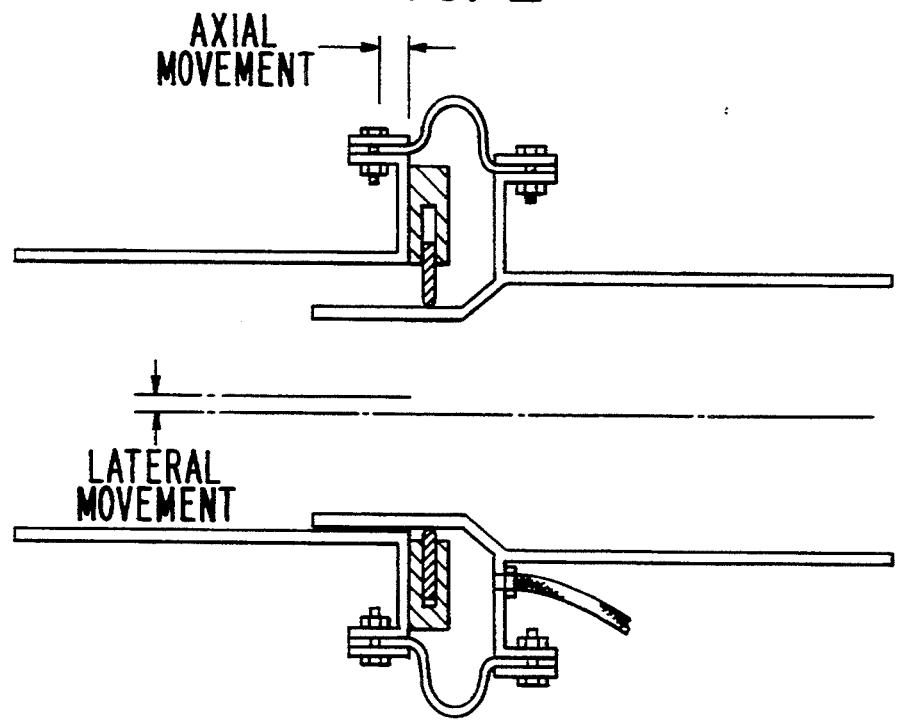
FIG. 2 is a cross-sectional view of the expansion joint of the present invention reacting to combined axial and lateral movement of the conduits.

A cartridge 109 is attached at one end of the first conduit 101 and comprises a closed loop or frame. The cartridge 109 is provided with a channel or annular groove 111 defined on an inner surface of the cartridge 109 facing the liner 105, and may be fabricated from a single piece of material as shown in FIGS. 1-2 or as an assembly of pieces as shown in FIG. 3. Attachment of the cartridge 109 to the first conduit 101 may be accomplished with standard mechanical fasteners and a gasket, to a flange 119 for example, or by any other means which would provide the requisite strength and resistance to leaking for a given application.

A ring 113 "floats" within the channel or annular groove 111 while fitting over, or collaring, the liner 105. The ring 113 is typically round or rectangular in shape, since these are common cross-sectional shapes for a liner 105, but may take other forms as wells so long as an outer peripheral surface 133 of the ring 113 fits within the channel or groove 111 of the cartridge 109 with enough room to translate laterally within design constraints. Similarly, an inner surface (designated 123 in FIG. 1(a)) of the ring 113 must be able to slide over the liner 105 with very little clearance, for example about 0.030 to about 0.060 inches. The ring 113 is thus held captive by the cartridge 109 and liner 105, and is guided laterally by the internal surface or groove 111 of the cartridge 109. The internal surface 111 of the cartridge 109 is designed with sufficient clearance for the ring 113 to essentially "float" with the movement of the liner 105 in the lateral direction, offering little or no restriction to movement within the design parameters. The width "w" of the groove 111 could, for example, be from about 0.030 to about 0.060 inches wider than the thickness "t" of the ring 113 to avoid restriction. Additionally, the outer peripheral surface 133 of the ring 113 may be contoured or rounded to prevent catching or galling of the ring 113 in the groove 111. The ring 113 and cartridge 109 can be constructed of almost any solid material, but are normally some type of metal or plastic or combination thereof.

Figure 1A:
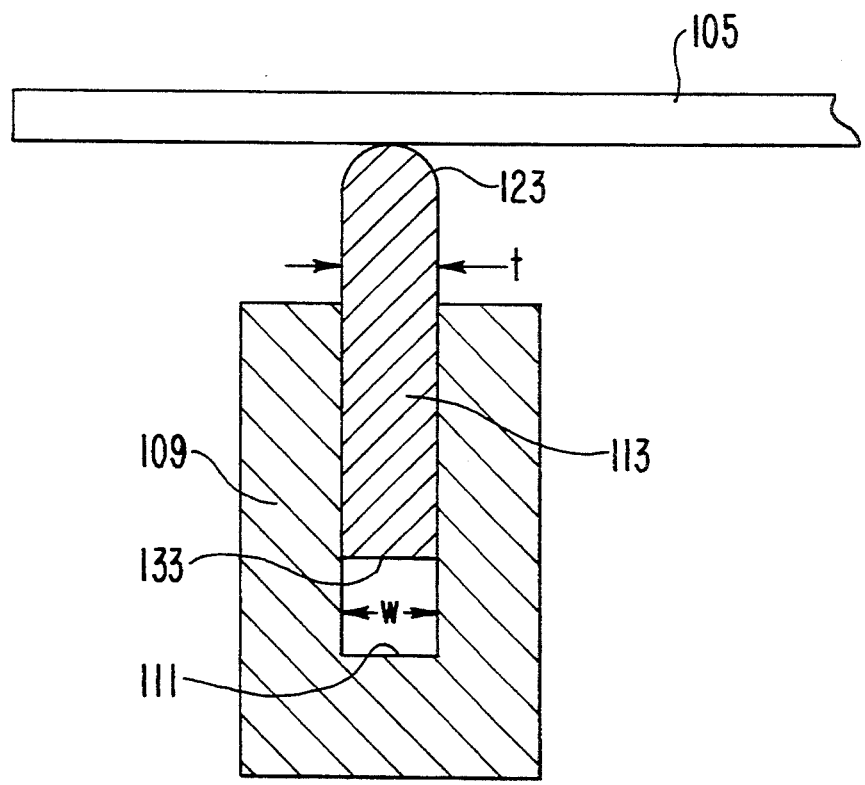
FIG. 1(a) is an expanded view of the circled portion of FIG. 1.

The close fit of the ring 113 and the liner 105 of the expansion joint 100 allows unlimited axial movement since the liner 105 slides through the ring 113 without restriction. The internal surface 123 of the ring 113 may also be contoured or rounded as shown in FIG. 1(a), such that it offers little or no restriction to angular movement of the liner 105. Since the ring 113 moves in concert with the liner 105 in the lateral direction and floats within the cartridge 109, it offers no resistance to lateral movement in any direction.

As mentioned previously, FIG. 3 shows another expansion joint 200 according to the present invention in which a first conduit 201 is joined to a second conduit 203. The first conduit 201 is shown having a flared end portion which faces a liner 205 which is formed separately from the second conduit 203. A bellows 207 is connected between flange portions 219 and 221, which are affixed to the first and second conduits 201 and 203, respectively, as shown. Similarly, the liner 205 is attached to the second conduit 203 at flange 221 using suitable gaskets and fasteners. The cartridge 209 and ring 213 operate as previously discussed. Unlike the expansion joint of FIGS. 1-2, however, this expansion joint is provided with a purge fluid inlet 217 which leads from a purge fluid line into the cartridge 209.

Thus, purge fluid can be introduced directly into the expansion joint cavity 115, as shown in FIGS. 1-2, or more ideally into the cartridge 209 of the expansion joint 200, as shown in FIG. 3. The introduction of purge fluids helps prevent the intrusion of the service fluid and its associated contaminants into the expansion joint cavity 115 (or 215). Where the purge fluid is to be introduced into the expansion joint cavity 115 directly, it is preferably fed through a purge fluid inlet 117 formed in the flange portion 121 of the second conduit 103. Alternatively, as shown in FIG. 3, the purge fluid may be introduced into the cavity defined by the cartridge groove 211 of cartridge 209 and the outer peripheral surface 233 of the ring 213 through a purge fluid inlet 217. In the latter embodiment, an outlet port 223 is preferably formed in a side wall of the cartridge 209 so as to communicate the purge fluid into the expansion joint cavity 215. In either case, conventional fluid lines and connections can be used to transport the fluid from a fluid source to the expansion joint. The close gaps achieved between the components by virtue of the floating seal, however, reduces the amount of purge fluid that is required.

The purge fluid can be almost any liquid or gas which is convenient and tolerable in the process, taking both chemical and thermal impacts into consideration. The purge fluid may, for example, be simple fluids like water, steam, or air, or more complex fluids like re-cycled, clean process liquid, and gas or air separation products. As mentioned previously, purge fluid is usually relatively costly to produce and transport; sometimes it is considered more valuable than the service fluid or normal flowstream.

The primary advantage of the present expansion joint over conventional purged expansion joints is that the purge flow rate can be minimized. Reducing purge flow rate generally increases operating efficiency, reduces costs, and increases purity of the flowstream. Another advantage which is achieved through the use of the present expansion joint is that the expansion joint cavity, and flexible element in particular, are subjected to a more controlled environment in terms of mechanical, chemical, and/or thermal conditions. For example, purge fluid (whether it be a liquid or gas) could be used to cool or heat the cavity to produce a more desirable environment for the expansion joint. Small amounts of purge fluid could at the same time be used to eliminate the introduction of particulate from the flowstream. Even though the flowstream may be chemically demanding, the purge fluid may be selected so that the expansion joint and associated hardware are not chemically attacked. Other methods of using purge fluid (without the present expansion joint) require large flow rates which are usually unacceptable from an economic and/or chemical process standpoint.

The expansion joint is particularly useful in applications where a stagnancy in the flowstream can cause an unwanted chemical reaction and an obstruction to the normal function of the expansion joint, such as in methylacrylate plants. It is also useful in other chemical plant applications, such as those involving transport of slurries (solids suspended in a liquid flowstream) or particulate-laden gas flowstreams. Use of the expansion joint of the present invention would also benefit sulfur-injected NOX reduction systems, such as those used for air pollution control.

While the invention has been described with reference to particular embodiments thereof, those skilled in the art will appreciate that certain modifications and additions can be made without departing from the field of the invention which should only be limited in scope by the appended claims.

What is claimed is:

1. An expansion joint comprising:
first and second conduits connected by an expansion joint element, said second conduit having a liner portion which protrudes into said first conduit such that said expansion joint element, said first conduit, said second conduit and said liner portion define an expansion joint cavity therebetween;
a cartridge disposed within said expansion joint cavity and affixed to said first conduit around said liner portion, said cartridge including a groove which faces said liner portion;
a ring which is disposed within said groove and which has an inner surface forming a collar around said liner portion; and wherein
said expansion joint element is an elastic tube.

2. An expansion joint comprising:
first and second conduits connected by an expansion joint element, said second conduit having a liner portion which protrudes into said first conduit such that said expansion joint element, said first conduit, said second conduit and said liner portion define an expansion joint cavity therebetween;
a cartridge disposed within said expansion joint cavity and affixed to said first conduit around said liner portion, said cartridge including a groove which faces said liner portion;
a ring which is disposed within said groove and which has an inner surface forming a collar around said liner portion; and
a purge fluid inlet which leads into said expansion joint cavity.

3. An expansion joint comprising:
first and second conduits connected by an expansion joint element, said second conduit having a liner portion which protrudes into said first conduit such that said expansion joint element, said first conduit, said second conduit and said liner portion define an expansion joint cavity therebetween;
a cartridge disposed within said expansion joint cavity and affixed to said first conduit around said liner portion, said cartridge including a groove which faces said liner portion;
a ring which is disposed within said groove and which has an inner surface forming a collar around said liner portion; and wherein
said cartridge includes a purge fluid inlet which leads into a cartridge cavity defined by an outer peripheral surface of said ring and said groove, and a purge fluid port which leads from said cartridge cavity to said expansion joint cavity.

4. An expansion joint comprising:
first and second conduits connected by an expansion joint element, said second conduit having a liner portion which protrudes into said first conduit such that said expansion joint element, said first conduit, said second conduit and said liner portion define an expansion joint cavity therebetween;
a cartridge disposed within said expansion joint cavity and affixed to said first conduit around said liner portion, said cartridge including a groove which faces said liner portion;

a ring which is disposed within said groove and which has an inner surface forming a collar around said liner portion; and wherein said first and second conduits each include a flange portion, said expansion joint element is connected between said flange portions, and said cartridge is affixed to said flange portion of said first conduit.

5. An expansion joint comprising:

first and second conduits connected by an expansion joint element, said second conduit having a liner portion which protrudes into said first conduit such that said expansion joint element, said first conduit, said second conduit and said liner portion define an expansion joint cavity therebetween;

a cartridge disposed within said expansion joint cavity and affixed to said first conduit around said liner portion, said cartridge including a groove which faces said liner portion;

a ring which is disposed within said groove and which has an inner surface forming a collar around said liner portion; and said expansion joint element is a bellows.

6. An expansion joint liner seal comprising a frame-like cartridge with an inwardly facing groove for attachment to a flange portion of a first conduit and a ring disposed partially within said groove for collaring a liner portion of a second conduit; and wherein said cartridge includes a purge fluid inlet leading into a cartridge cavity defined by said groove and an outer peripheral surface of said ring, and a purge fluid port which leads from said cartridge cavity to an expansion joint cavity.

7. A method for transporting service fluid through an expansion joint comprising the steps of:

a) providing an expansion joint including first and second conduits connected by an expansion joint element, said second conduit having a liner portion which protrudes into said first conduit such that said expansion joint element, said first conduit, said second conduit and said liner portion define an expansion joint cavity therebetween;

a purge fluid inlet which leads into said expansion joint cavity;

a cartridge disposed within said expansion joint cavity and affixed to said first conduit, said cartridge including a groove which faces said liner portion; and a ring which is disposed within said groove and which has an inner portion forming a collar around said liner portion;

b) introducing purge fluid into said expansion joint cavity through said purge fluid inlet; and c) transporting a service fluid through said first and second conduits.

* * * * *